UNITED STATES PATENT OFFICE.

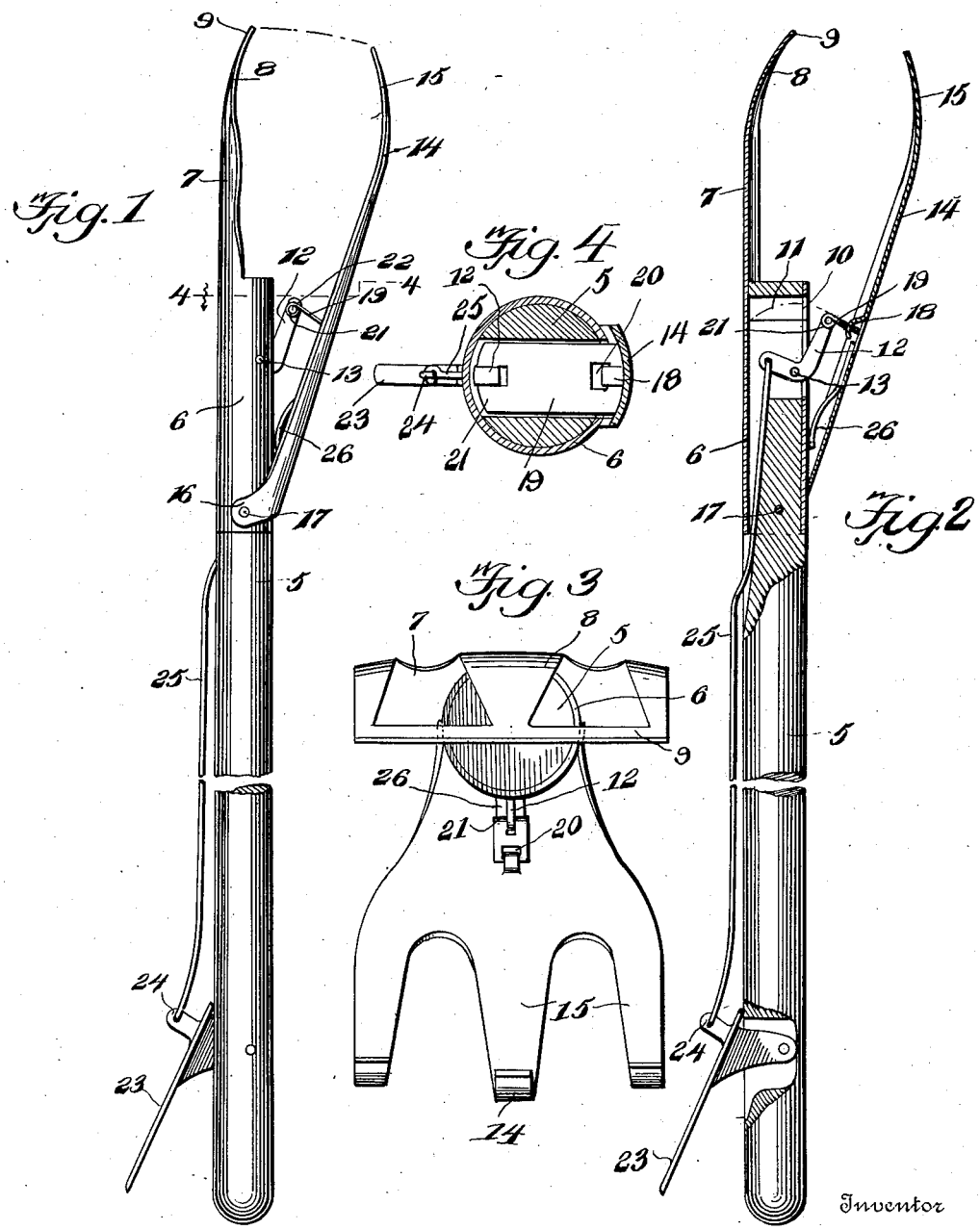

WILLIAM H. NEWVILLE, OF DELTA, COLORADO.

TONGS.

1,021,790. Specification of Letters Patent. Patented Apr. 2, 1912.

Application filed February 11, 1911. Serial No. 607,980.

*To all whom it may concern:*

Be it known that I, WILLIAM H. NEW-VILLE, a citizen of the United States, residing at Delta, in the county of Delta and State of Colorado, have invented new and useful Improvements in Tongs, of which the following is a specification.

The invention relates to tongs, and more particularly to the class of laundry or kitchen tongs.

The primary object of the invention is the provision of tongs in which clothes may be lifted from a steam or wash boiler, or hot pans or other receptacles may be removed from a baking oven or a stove, without possibility of a person being burned that would necessarily result from actual contact with the wet clothes or the pans or receptacles.

A further object of the invention is the provision of a device of this character which is simple of construction, thoroughly reliable and efficient in its purpose, and inexpensive in manufacture.

With these and other objects in view, the invention consists in the construction, combination and arrangement of parts, as will be hereinafter more fully described, illustrated in the accompanying drawings, and pointed out in the claim hereunto appended.

In the drawings: Figure 1 is a side elevation of a device constructed in accordance with the invention. Fig. 2 is a fragmentary vertical longitudinal sectional view thereof. Fig. 3 is an end elevation. Fig. 4 is a sectional view on the line 4—4 of Fig. 1, when the movable jaw is in closed position.

Similar reference characters indicate corresponding parts throughout the several views of the drawings.

Referring to the drawings by numerals, 5 designates a stick or handle which may be of any desirable length, and is preferably cylindrical and of uniform diameter throughout its extent, having fitted thereon at one end a ferrule 6, the exterior surface of which is flush with the outer surface of the stick or handle 5, and has projecting therefrom a stationary jaw 7 provided with a plurality of forwardly diverging outwardly arched fingers 8, the free ends of which are connected by means of a cross web 9, the ferrule 6 being formed with an elongated slot 10 opening into a cavity 11 in the stick, in which is arranged a bell crank lever 12, the latter being connected to the ferrule and stick by means of a cross pivot 13, whereby the said bell crank lever may be rocked, for a purpose as will be hereinafter more fully described.

Connected with the ferrule is a movable jaw 14, the same being provided with outwardly bowed forwardly diverging fingers 15 at one end, while at its opposite end are formed spaced bearing ears 16, through which is passed a pivot pin 17, the latter being also passed through the ferrule 6 and the stick 5 for the mounting of the movable jaw thereon.

Struck in from the movable jaw 14 is a hook-like ear 18, with which is detachably engaged one end of a link 19, the latter being provided with a slot 20, in which the hook-like ear is engaged and is also further provided with spaced eyes 21 receiving a pivot pin 22, the latter being passed through one end of the bell crank lever 12, for connecting the link thereto, the said link being adapted to move into and out of a suitable opening formed in the ferrule and intersecting the cavity or recess in the stick, so that upon the closing of the movable jaw, the link will pass into the cavity and when the said movable jaw is opened, it will move out of the said cavity, the movable jaw being actuated in a manner as will be hereinafter more fully described.

At the gripping end of the stick or handle 5 is pivoted a rocking hand lever 23, the same being provided with an upstanding lug 24, to which is loosely connected one end of a pull rod 25, the same being also loosely connected to the other end of the bell crank lever 12, so that upon depressing the hand lever 23, it will cause the movable jaw to approach the stationary jaw, whereby wet clothes or hot pans may be grabbed thereby for the moving of the same from one point to another.

The movable jaw has fixed thereto a bowed leaf spring 26, the free end of which is adapted to work against the ferrule 6, and this spring is designed to normally hold the movable jaw separated from the stationary jaw, or in other words, in open position.

It is clearly apparent that the device may be utilized for lifting or removing pans or culinary vessels from a stove, without direct contact of the hands therewith, thus preventing the burning of the hands and enabling the pans or vessels to be kept sanitary.

From the foregoing, it is thought that the construction and operation of the invention will be readily understood, without requiring a more extended explanation, and therefore, the same has been omitted.

What is claimed is:

In a device of the class described, a stick provided with a cavity near one end thereof, a ferrule fitted on the stick and provided with an elongated slot communicating with said cavity, a stationary jaw formed on and extending from said ferrule, a movable jaw connected with the ferrule and stick and adapted to be swung toward and away from the stationary jaw, a bell-crank lever pivoted within the cavity and projecting through the slot in the ferrule, a hook-like ear cut and struck inwardly from the movable jaw, a link loosely connected with the ear and pivoted to the bell crank lever, and hand operable means carried by the stick and connected with the bell crank lever for bringing the movable jaw toward the stationary jaw.

In testimony whereof I affix my signature in presence of two witnesses.

WILLIAM H. NEWVILLE.

Witnesses:
   W. L. PITCHER,
   C. J. LIPPERT.

---

Copies of this patent may be obtained for five cents each, by addressing the "Commissioner of Patents, Washington, D. C."